Figure 1:
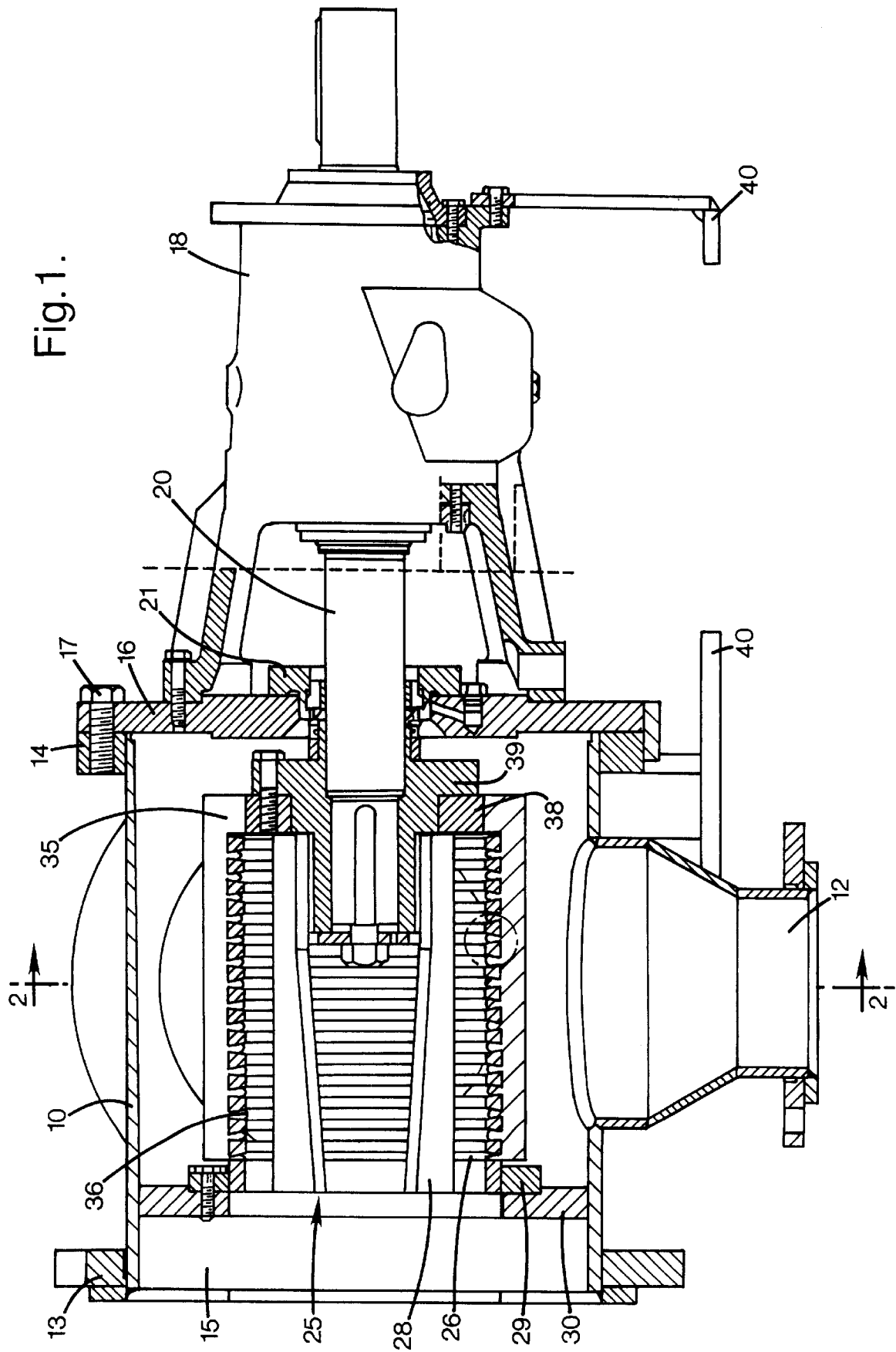

United States Patent
Clarström et al.

[19]

[11] Patent Number: 5,967,335
[45] Date of Patent: Oct. 19, 1999

[54] SCREENING DEVICE FOR SCREENING A SUSPENSION

[75] Inventors: Bo Clarström, Kil; Ronny Höglund, Skoghall, both of Sweden

[73] Assignee: Kvaerner Pulping AB, Sweden

[21] Appl. No.: 08/849,961

[22] PCT Filed: Dec. 14, 1995

[86] PCT No.: PCT/SE95/01505

§ 371 Date: Jun. 6, 1997

§ 102(e) Date: Jun. 6, 1997

[87] PCT Pub. No.: WO96/19614

PCT Pub. Date: Jun. 27, 1996

[30] Foreign Application Priority Data

Dec. 22, 1994 [SE] Sweden .................................. 9404451

[51] Int. Cl.[6] .......................................................... B07B 1/52
[52] U.S. Cl. ........................... 209/389; 209/300; 209/385
[58] Field of Search ..................................... 209/273, 274, 209/276, 278, 281, 283, 300, 379, 385, 386, 389; 210/413, 414, 415

[56] References Cited

U.S. PATENT DOCUMENTS 4,303,508  12/1981  Skretting .............................. 209/385 X
5,051,167  9/1991  Hoglund .................................. 209/300
5,622,267  4/1997  Hautala ..................................... 209/273

FOREIGN PATENT DOCUMENTS 2750499   5/1979   Germany .............................. 209/273
1286299   1/1987   U.S.S.R. .............................. 209/385
WO 84/04293  11/1984  WIPO .

*Primary Examiner*—Tuan N. Nguyen
*Attorney, Agent, or Firm*—Fasth Law Offices; Rolf Fasth

[57] ABSTRACT

Arrangement for separating off undesired particles from a suspension stream. The arrangement has a closed housing with an inlet for the suspension from which particles are to be separated off, an outlet for the treated suspension and an outlet for undesired particles. The arrangement also includes a screening drum that is perforated by a number of circular slits and cleaning members that are disposed inside the housing. The screening drum is immovable and the cleaning members are arranged to rotate along a circumferential surface of the screening drum and down into the circular slits.

6 Claims, 3 Drawing Sheets

SCREENING DEVICE FOR SCREENING A SUSPENSION

TECHNICAL FIELD

The present invention relates to an arrangement for separating off undesired particles from a suspension stream in accordance with the precharacterizing clause of Patent claim 1.

STATE OF THE ART

It is already known to clean undesired particles, such as knots, stone and tramp material, from pulp suspensions, for example in advance of a pulp press. Many arrangements are provided with rotating screening drums of varying configuration and with fixed cleaning members, such as, for example, the arrangement which is described in SE-B-426 180. This arrangement has a rotating screening drum provided with circular slits and a fixed, comb-like cleaning member, in which arrangement the teeth of the cleaning member fit in the slits. The arrangement is intended primarily for obtaining a sub-stream of finer pulp fibres having passed through the slits of the screening drum, for so-called liner production without undesired particles. The remainder of the suspension stream is conveyed past the screening arrangement. The arrangement functions well for relatively low concentrations (<5% pulp fibres). In the arrangement according to SE-B-426 180, there is a tendency, at higher concentrations, for the slits in the screening drum to clog up relatively quickly after the cleaning member has passed them, and there are difficulties in conveying the undesired particles off in an appropriate manner.

BRIEF DESCRIPTION OF THE INVENTION

The object of the present invention is to provide a screening arrangement which can clean undesired particles from a pulp suspension and in so doing can satisfy stringent requirements both as regards capacity and the possibility of treating the suspension flow at high concentration, and where the undesired particles can be led off from, and collected in a suitable way at, the screening arrangement. This object is achieved by means of an arrangement for separating off undesired particles from a suspension stream in accordance with the characterizing clause of Patent claim 1.

DESCRIPTION OF THE FIGURES IN THE DRAWINGS

Figure 2:
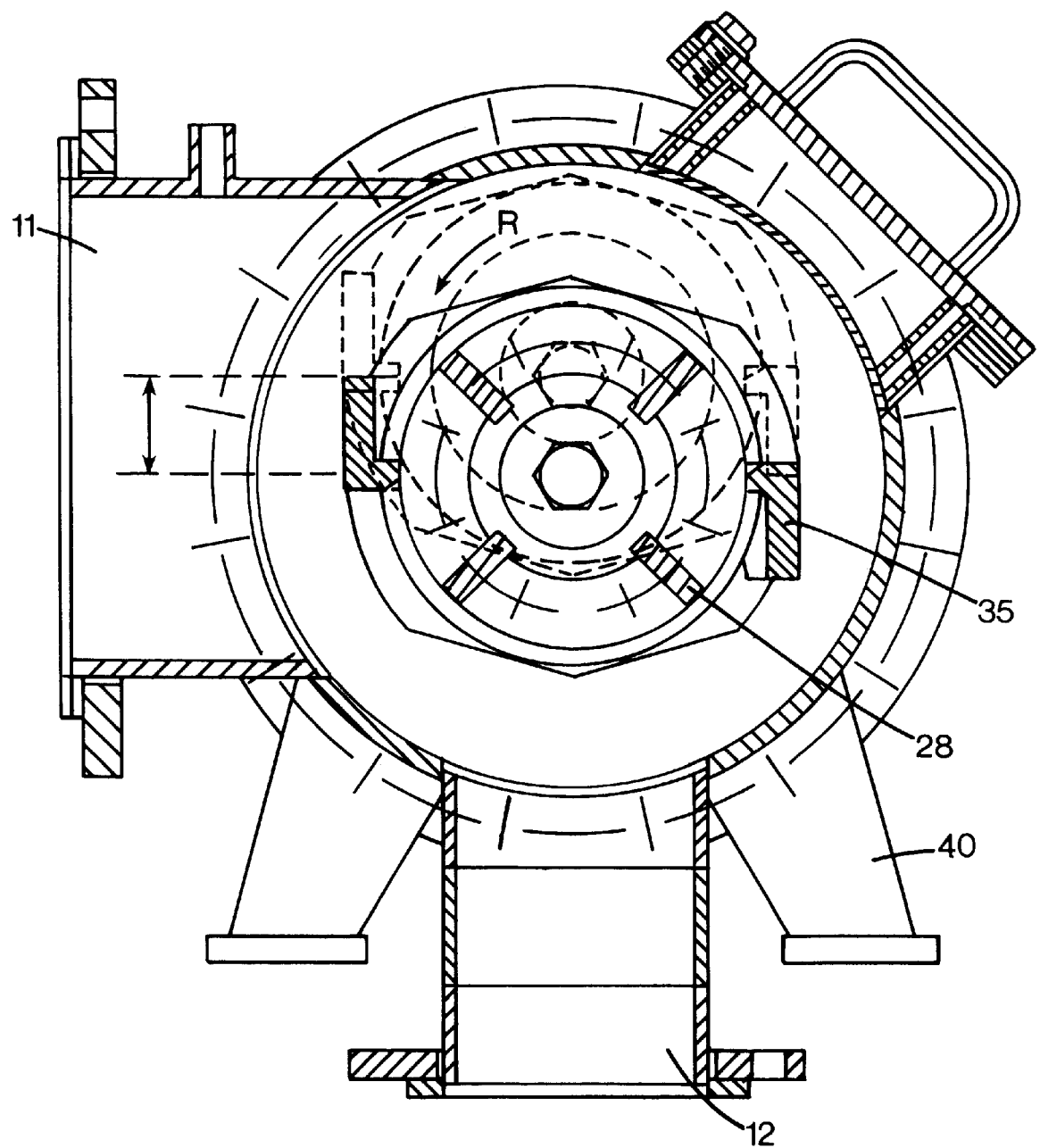
Figure 3:
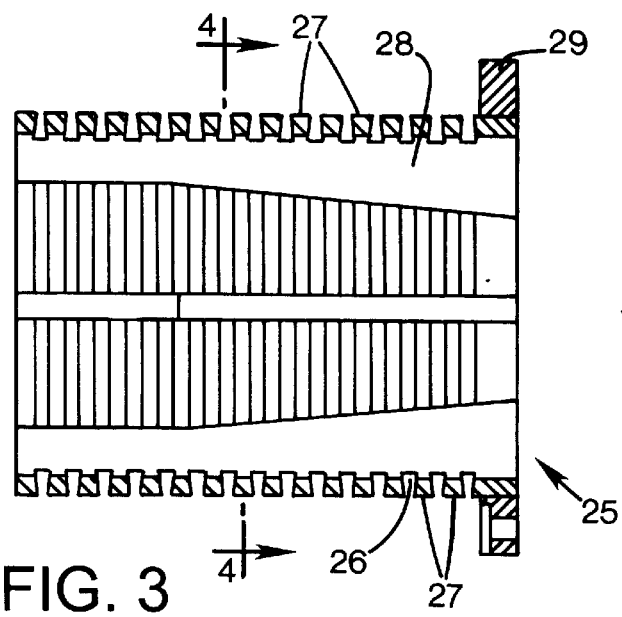
Figure 4:
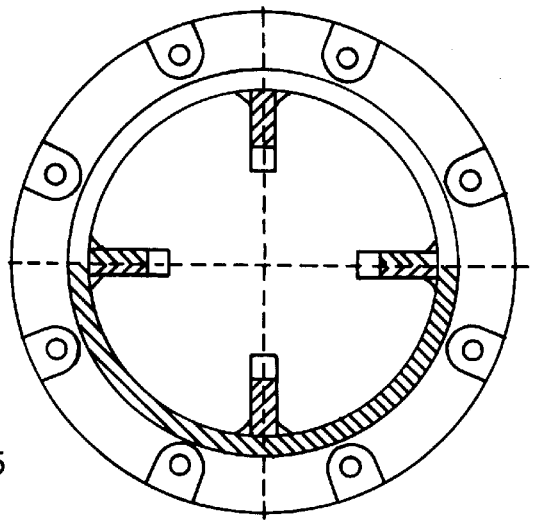
Figure 6:
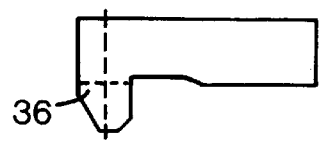
Figure 5:
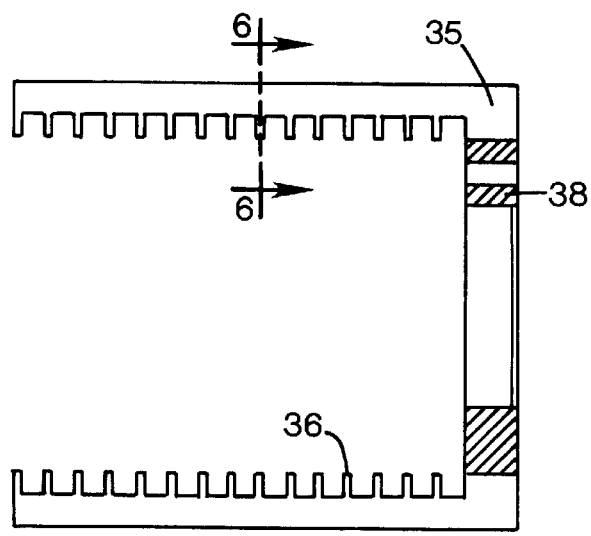
Figure 7:
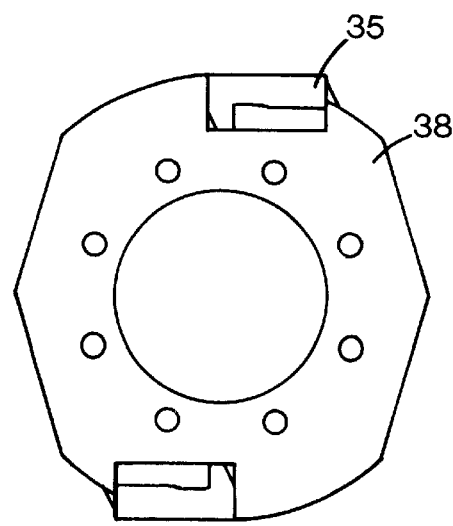

The arrangement according to the invention will be described in detail below in connection with a preferred embodiment and with reference to the attached drawings, in which FIG. 1 shows a side view, in partial cross-section, of the arrangement according to the invention, FIG. 2 shows a cross-sectional end view taken along the line II—II in FIG. 1, FIGS. 3 and 4 show detailed views of the screening drum according to a preferred embodiment, and FIG. 5–7 show detailed views of one of the cleaning combs according to a preferred embodiment.

PREFERRED EMBODIMENT

The arrangement according to a preferred embodiment of the invention which is shown in FIGS. 1 and 2 consists of an essentially cylindrical housing 10 with a centre line C. The housing is provided with an inlet 11 for the suspension which is to be treated, which inlet 11 is placed approximately in the middle of the housing 10, and, along the periphery of the housing at a distance from the inlet, an outlet 12 for the particles which have been removed. The outlet 12 is arranged facing vertically downwards. The inlet and outlet are preferably offset by 90° along the periphery of the housing, but other configurations are also possible.

The housing 10 is provided at each end with flanges 13, 14 which are mounted fixed in a suitable manner. One end 15 of the housing is open and functions as an outlet for the treated suspension. The end 15 is connected with the aid of the flange 13 to a conduit system (not shown) for onward transport of the suspension. The other end of the housing 10 is provided with an end wall plate 16 which is fastened releasably on the flange 14 of the housing, with the aid of screws 17 for example. A bearing member 18 is mounted on the end wall plate 16, and this bearing member 18 is also releasable. A drive shaft 20, which is rotatably mounted in the bearing member 18, extends through the centre of the end wall plate 16 and some distance into the interior of the housing, its axis of rotation preferably coinciding with the centre line C of the housing. The drive shaft 20 is sealed off from the end wall plate 16 with the aid of a suitable sealing member 21. The drive shaft 20 is made to rotate with the aid of a suitable drive arrangement (not shown).

A screening drum 25 (FIG. 3), which is designed as a cylinder whose circumference is perforated by circular slits 26, is arranged in such a way that its centre line coincides with the axis of rotation of the drive shaft 20. The slits 26 are preferably shaped in such a way that their width slightly increases radially inwards in order to counteract clogging. The inward widening can be about 3° for each slit wall. The screening drum 25 is provided with radially inwardly directed spokes 28 for holding together the annular portions 27 between the slits 26. One end of the screening drum 25 is provided with a flange 29 for releasable mounting on an annular securing member 30 which is arranged in a fixed manner on the inner wall of the housing closely adjoining the outlet 15 for the treated suspension.

The arrangement is also provided with cleaning members 35 (FIG. 4) in the form of cleaning combs with a number of teeth 36 which extend downwards in the slits 26 of the screening drum 25. These cleaning combs 35, of which there are two in the preferred embodiment, are mounted diametrically opposite on a bracket 38. This bracket 38 is mounted releasably on a holder member 39 which is in turn mounted releasably on the end of the drive shaft 20. In the preferred embodiment, the cleaning combs 35 are designed essentially as an L profile lying on its side, with one limb of the L being directed inwards and arranged first in the direction of rotation R (FIG. 2) seen when the cleaning combs are mounted. Recesses have been formed in this inwardly directed limb for the purpose of receiving a number of teeth 36. The design is such because the cleaning combs are subjected during operation to high bending moments since they are secured on the holder 38 only at their one end. The teeth 36 are preferably provided with a bevel at their front edge, as seen in the direction of rotation R.

The arrangement is preferably provided with supports 40 for mounting on a base plate, for example.

The functioning is as follows. With the aid of the drive shaft 20 which is connected to a drive arrangement (not shown), the cleaning combs 35, which are two in number in the preferred embodiment, are made to rotate about the circumferential surface of the screening drum 25, counterclockwise in FIG. 2, and with the cleaning teeth 36 in the slits of the screening drum. The cleaning combs 35 are preferably placed diametrically opposite each other in order to obtain an even load on the drive shaft 20. The suspension which is to be treated, and which contains undesired particles such as knots, stone and tramp material, enters the housing via the inlet 11. Since the cleaning combs 35 rotate around the circumferential surface of the drum 25 with the teeth 36 down in the slits 26, they keep these continuously open for the liquid and the fibres in the suspension which can pass through the slits 26 in the screening drum 25 and out through the outlet 15. The undesired particles are of such a size, however, that they cannot pass through the slits, and instead are cleaned away by the cleaning combs 35 and drop by force of gravity down through the outlet 12 for reject material and down into a vertical pipe-like collection container (not shown). The container can be arranged with valves for discharging at suitable intervals. Alternatively, it can be arranged with a discharging arrangement of the revolving door type with compartments or cells.

Depending on what is to be screened off from the suspension, the circular slits 26 of the screening drum are designed with an appropriate width such that the undesired particles cannot pass through the slits and into the interior of the drum, where it is desired that only accepted suspension should be present.

When dismantling the cleaning combs from the screening drum, the combs are turned so that they are horizontal. The fastening screws 17 of the end wall plate are then unfastened, and the bearing unit 18, with the end wall plate 16, the drive shaft 20 and the cleaning combs 35, is lifted about 60 mm (FIG. 2). In this way, the teeth of the cleaning combs are released from engagement with the screening drum, and the entire unit can be withdrawn from the housing, to the right in FIG. 1.

By virtue of the design of the arrangement, the slits 26 in the screening drum 25 are kept open longer, and a more even distribution of the accepted pulp is achieved. Since the passage area is thus kept greater, the drop in pressure is less and, consequently, the pump demands lower. The rotating cleaning combs also generate a "mixing" and movement in the housing which counteracts clogging, i.e. the function of the arrangement is less sensitive to variations in consistency and flow. In addition, the arrangement is completely closed and can therefore operate without admission of air and without any foaming resulting from admission of air, which could lead to operating disruptions.

It will be understood that the arrangement according to the present invention is not limited to the embodiment which has been described, and that it can instead be modified within the scope of the patent claims which follow. Thus, the arrangement can be provided with a plurality of cleaning combs, preferably in diametrically opposite pairs, so that an even loading of the drive shaft 20 is obtained. In addition, the cleaning combs 35 can be formed in a number of different ways, for example by welding the teeth onto a square rod.

We claim:

1. An arrangement for separating off particles from a fiber suspension stream, comprising:

a closed housing having an inlet defined therein, the inlet being adapted to receive a fiber suspension including particles to be removed from the fiber suspension;

a first outlet defined in the closed housing, the first outlet being adapted to permit the fiber suspension to flow out of the closed housing;

a second outlet defined in the closed housing, the second outlet being adapted to permit the particles removed from the fiber suspension to flow out of the closed housing, the second outlet being oriented in a direction that is perpendicular to the inlet;

a fixed screening drum secured to the closed housing, the screening drum having a number of circular slits defined therein and an outer circumferential surface, the second outlet being disposed vertically below the screening drum; and cleaning members disposed within the closed housing, the cleaning members being rotatable relative to the closed housing and adapted to rotate about and along the outer circumferential surface of the screening drum and, the cleaning members extending down into the circular slits.

2. The arrangement according to claim 1 wherein the cleaning members are arranged in pairs disposed diametrically opposite one another.

3. The arrangement according to claim 1 wherein the cleaning members are comb-shaped and the cleaning members have teeth that protrude downwardly into the circular slits of the screening drum.

4. The arrangement according to claim 1 wherein the second outlet is disposed vertically below the closed housing.

5. The arrangement according to claim 1 wherein the inlet is disposed on a side of the closed housing and the first outlet is disposed at a narrow end portion of the closed housing.

6. The arrangement according to claim 3 wherein the closed housing is substantially cylindrical and the screening drum is secured to an inner wall of the closed housing, the closed housing has a narrow end portion that is disposed opposite the first outlet, the narrow end portion has an end wall plate arranged with bearing members, a drive shaft is mounted in the bearing members, the drive shaft extends into the closed housing, the drive shaft has an axis of rotation that is aligned with a longitudinal axis of the screening drum, the cleaning members are disposed at an inner end of the drive shaft so that the cleaning members are movable about the circumferential surface of the screening drum upon rotation of the drive shaft and the teeth of the cleaning members are disposed in the slits of the screening drum.

\* \* \* \* \*